Oct. 28, 1958    G. C. VORE    2,857,964
VALVE OPERATING MECHANISM
Filed Jan. 23, 1956    2 Sheets-Sheet 1

Inventor
Gordon C. Vore
By McCanna and Morsbach
Attys.

Oct. 28, 1958     G. C. VORE     2,857,964
VALVE OPERATING MECHANISM
Filed Jan. 23, 1956     2 Sheets-Sheet 2
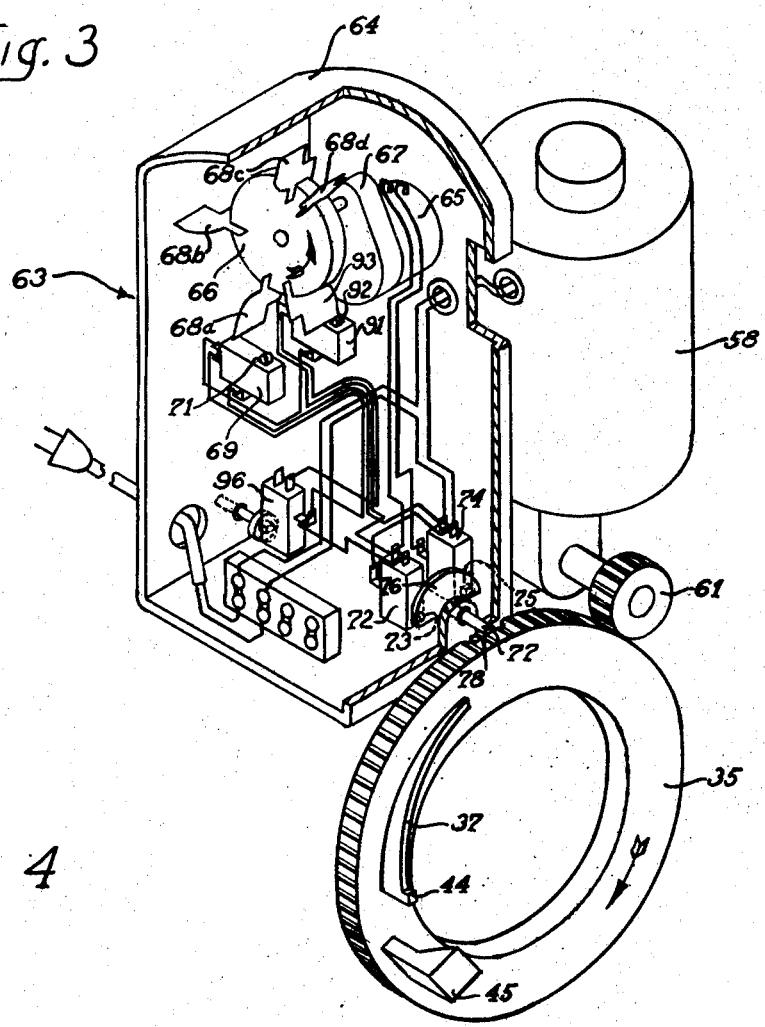
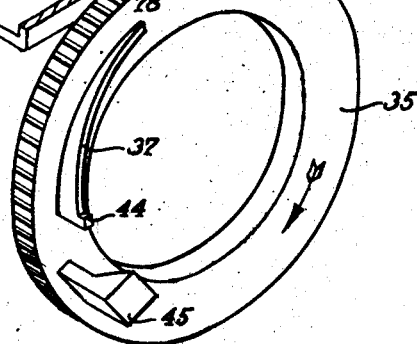
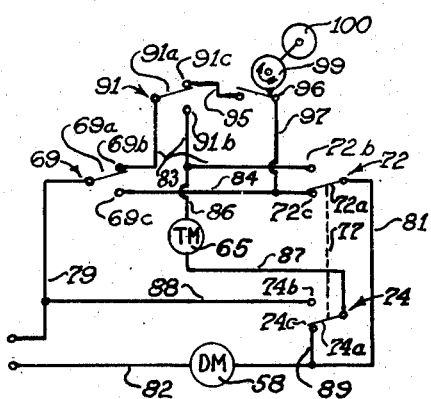
Inventor
Gordon C. Vore
By McCanna and Morsbach
Attys.

United States Patent Office 2,857,964
Patented Oct. 28, 1958

2,857,964

VALVE OPERATING MECHANISM

Gordon C. Vore, Rockford, Ill., assignor to AquaMatic Inc., Rockford, Ill., a corporation of Illinois Application January 23, 1956, Serial No. 560,636

7 Claims. (Cl. 161—7)

This invention relates to a motor operated valve of the lift-turn type and a control system therefor.

An important object of this invention is to provide a motor operated rotary valve and a control system for the valve motor to automatically step the valve from an initial position through each of a plurality of successive intermediate positions and back to its initial position at preselected time intervals.

Another object of this invention is to provide a rotary valve operator including a motor driven gear arranged to step the valve from one position to a succeeding position in response to rotation of the gear through one complete revolution, and a control system including a power control switch and a timer for operating the switch, which control system is so arranged as to effect rotation of the gear through only one revoluution each time the control switch is operated by the timer and independent of the duration of operation of the control switch by the timer.

A more particular object of this invention is to provide a control system for a valve including a valve drive motor, a power control switch and a timer having an operator arranged to engage the power control switch at periodic time intervals, which circuit is arranged to energize the drive motor and step the valve to a succeeding position in response to disengagement of the power control switch by the timer controlled operator whereby to prevent stepping of the valve between more than one position in response to a single actuation of the timer controlled switch.

Still another object of this invention is to provide a motor operated valve and control system therefor which is of simple construction, reliable in operation, and which utilizes a minimum number of switches.

These, together with various ancillary objects and advantages of this invention will be more readily appreciated as the same becomes better understood by reference to the following detailed description when taken in connection with the accompanying drawings wherein:

Fig. 3 is a diagrammatic perspective view of the valve operator and control apparatus; and Fig. 4 is a schematic diagram of the control system.

Figure 2:
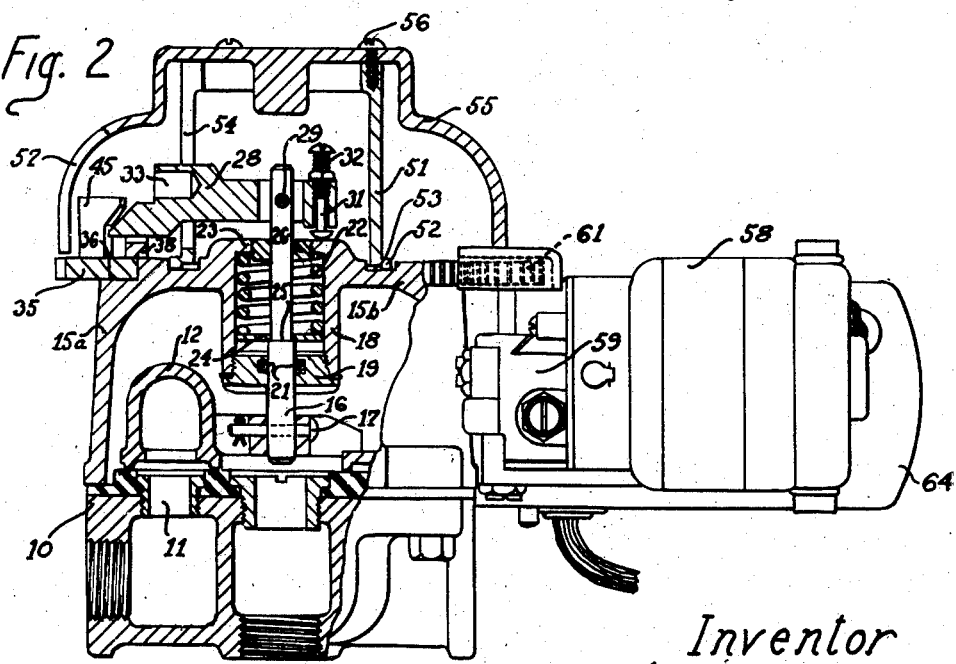
Fig. 2 is a side elevational view of the lift-turn valve and operator, with parts broken away and shown in section to illustrate details of construction.

The valve of the present invention, best shown in Fig. 2 is of the rotary lift-turn type and is particularly designed for use in controlling the flows to and from a water treatment apparatus such as a base exchange water treatment device, it being understood that the valve may be used for other applications, if desired. In general, the valve includes a back plate 10 having a plurality of ports 11 in the face thereof and a rotor 12 mounted in confronting relation with the back plate to control the flows through the several ports therein. The specific port and passage arrangement in the back plate and rotor may be of any suitable arrangement to produce the desired flows to and from the apparatus with which the valve is used. A housing 15 including an upstanding side wall 15a and a top wall 15b is attached to the back plate 10 and defines a sealed chamber at the upper side of the back plate.

In accordance with the present invention, the rotor 12 and the operating mechanism therefore are arranged to enable stepping of the rotor from an initial position to a plurality of successive intermediate positions and through one complete revolution back to its initial position. More particularly, a stem 16 is attached as by a pin 17 to the rotor and extends axially through a hollow boss 18 formed on the top wall 15b of the valve housing. A cap 19 is attached to the lower end of the boss 18, as by threaded engagement therewith and slidably and rotatably receives the stem 16. An O-ring 21 is mounted in an annular groove in the cap 19 to seal the interface between the stem and the cap.

The rotor 12 is yieldably urged towards its seated position against the back plate 10 by means of a spring 22. In the form of the valve illustrated, the spring 22 is disposed within the hollow boss 18 and engages an inturned rim 23 at the upper end thereof. The lower end of the spring abuts against a washer 24 which is slidably received within the boss 18 and which rests upon a shoulder 25 on the stem. A bearing member 26 is threaded into the flange 23 at the upper end of the hollow boss and slidably and rotatably receives the upper end of the rotor stem 16. A lever 28 is pivotally attached to the upper end of the valve stem 16 by means of a pin 29 and has a follower pin 31 at one end thereof arranged to engage the top wall of the housing 15. An adjustment screw 32 is threaded in the lever 28 and engages the pin 31 to adjust the position thereof. The lever 28 is thus operable upon being lifted and turned, to raise and turn the rotor 12. A socket 33 is formed in the other end of the lever for the reception of a suitable handle to enable manual lifting and turning of the rotor.

Figure 1:
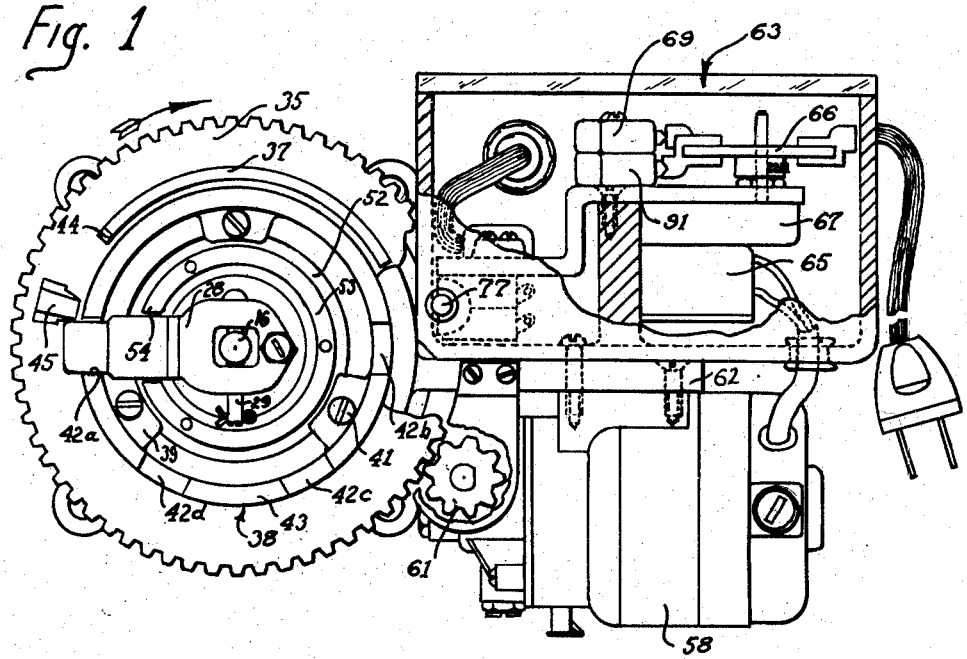
Figure 1 is a top plan view of the rotary lift-turn valve and operator therefor, with parts broken away to illustrate details of construction.

A motor operated mechanism is provided for raising, turning and reseating the rotor, which mechanism includes an annular ring gear 35 which extends around the valve housing and is mounted thereon in a recess 36 formed in the top wall of the valve housing. An arcuate cam member 37 (see Figs. 1 and 3) is attached to the ring gear and extends upwardly therefrom, which cam member is arranged to engage the lever 28 as the ring gear is rotated to lift the lever and thereby raise the rotor. A stationary annular cam track 38 is formed with inwardly extending lugs 39 and attached to the top wall 15b of the valve housing as by fasteners 41. The stationary cam track, as best shown in Fig. 1, is provided with a plurality of annularly spaced notches adapted to receive the lever 28 in each of the rotative positions of the rotor.

The form of the valve illustrated is specifically designed for use with a base exchange water treatment apparatus and accordingly the stationary cam track is formed with four notches 42a–42d, respectively, corresponding to the service, backwash, brining, and rinse positions of the valve. The back plate and rotor are arranged to establish the necessary flows to and from the treatment apparatus in the various operative positions of the valve. As is apparent, the number and arrangement of the operative positions of the valve may be varied from that described, if desired.

A cam surface 43 is provided on the upper edge of the cam track between each of the notches 42a–42d and each of the cam surfaces is inclined upwardly in the direction of rotation of the lever 28. As the arcuate cam member 37 carried by the ring gear is rotated, the cam member engages the lever 28 and raises the latter out of one of the notches 42. A stop 44 is provided adjacent the end of the cam member 37, which stop strikes the lever 28 and causes the latter to turn with the ring gear. The cam surfaces 43 on the stationary cam member 38 project relatively higher than the stop 44 on the cam member 37 so that the lever, as it rides upwardly on the cam surfaces 43, becomes disengaged from the cam member 37 and from the stop 44. A pusher finger 45 is provided on the ring gear 35 and spaced from the trailing edge of the cam member 37 thereon a distance greater than the width of the operating lever 28. The finger is arranged to pass over the operating lever when the latter is in its lowered position, and extends inwardly to engage the operating member when the latter is in its raised position resting on the trailing edge of the cam surfaces 43. The finger thus engages the lever to push it along the cam surfaces 43 until the lever drops into the next succeeding notch 42 in the cam track. The spring 22 is then operative to urge the rotor 12 to its lowered position against the stator body 10.

The control system of the present invention is arranged to drive the ring gear 35 from an initial position through one revolution and back to its initial position. The arcuate cam 37 and the pusher finger 45 will therefore always stop in the same position. As shown in Fig. 1, the arcuate cam and pusher, in the stopped position of the ring gear, are located between service notch 42a and backwash notch 42b. As the ring gear is rotated through its first revolution, the cam member 37 raises the lever 28 out of the notch 42a and the stop 44 at the end of the cam member engages the lever to move it along the stationary cam track. The ring gear then completes its revolution and stops with the stop 44 on the cam member 37 located intermediate the notches 42a and 42b in the cam track. The operating lever therefore remains in a raised position, intermediate the notches 42a and 42b, until the ring gear is again rotated through one revolution, at which time the operating lever is moved into the notch 42b. Thus, stepping of the valve operating lever from notches 42a to 42b requires two complete revolutions of the ring gear, while stepping of the lever between each of the other notches requires only one revolution.

A cover is provided for the operating lever and cams and arranged for rotation with the operating lever. For this purpose there is provided a cylindrical cage 51 having a flange 52 at its lower end rotatably received in an annular groove 53 in the top wall 15b of the valve housing. The flange 52 on the cage underlies the inner edge of the lugs 39 formed on the stationary cam track 38 and is retained in position thereby on the housing. The cage is formed with a vertically disposed slot 54 for the reception of the operating lever 28, which cage engages the lever as the latter is rotated to thereby turn with the lever. A bell-shaped cover 55 is attached to the cage as by fasteners 56 and overlies the operating lever and the cam members on the top of the valve housing. A slot 57 is formed in the cover in registry with the slot 54 in the cage to enable insertion of a handle into the socket 33 on the operating lever, in the event it is necessary by reason of a power failure or the like, to manually operate the valve between its successive positions.

The ring gear 35 is driven from a drive motor 58 through a speed reduction mechanism 59 and a pinion 61 which meshes with the ring gear. The rotor is conveniently mounted on a radially extending bracket 62 which is cast integrally with the valve housing 15 and extends substantially radially thereof, as best shown in Fig. 1. The control apparatus for energizing the motor to step the latter between successive positions at preselected time intervals is designated generally by the numeral 63 and mounted at the side of bracket 62 opposite the motor 58.

The control apparatus 63 is enclosed in a casing 64 and includes a timer motor 65 which drives a timer disk 66 through a gear reducing mechanism 67. The gear reducing mechanism is arranged to drive the timer disk through one revolution in a time interval corresponding to the duration of the cycle of operations of the valve. For example, when the valve and control apparatus is used in conjunction with a base exchange water treatment system to effect regeneration thereof, the timer disk is arranged to be rotated through one revolution in a time interval of the order of ninety minutes and a plurality of vanes or switch operators 68a–68d are mounted on the timer disk for angular adjustment relative thereto to enable adjustment of the duration of the various phases of the regeneration cycle. A power control switch 69 is mounted in the housing and includes an operator 71 adapted to be engaged by the vanes 68a–68d as the timer disk is rotated. An index switch 72 having an operator 73 and a timer control switch 74 having an operator 75 are mounted in side-by-side relation in the casing 64 and each arranged for engagement by a common switch actuator 76 having a cam follower 77. The ring gear 35 on the valve is provided with a well 78 at the underside thereof and the cam follower 77 is arranged to ride across the underside of the ring gear and drop into the well when the latter registers with the cam follower.

The control system is arranged, upon starting of the cycle of operations, to rotate the ring gear through two revolutions to step the operating lever from the service notch 42a to the backwash notch 42b and to thereafter periodically energize the drive motor at preselected time intervals corresponding to the duration of the various phases of the operating cycle of the valve to rotate the ring gear 35 through one complete revolution and thereby step the lever 28 from the backwash notch 42b successively to the brine injection notch 42c, the rinse notch 42d and back to the service notch 42a. The power control switch 69 is employed as a three-way switch including a switch member 69a and dual contacts 69b and 69c. The index switch 72 is also employed as a three-way switch including a switch member 72a and contacts 72b and 72c. The power control switch and the index switch are connected to the drive motor in a three-way circuit arrangement to effect control of the drive motor by both the timer 65 and the position of the ring gear 35. More specifically, the switch member 69a of the power control switch is connected through a conductor 79 to a source of power and the switch member 72a of the index switch is connected through a conductor 81 to the drive motor 58, the other terminal of which drive motor is connected through a conductor 82 to the source of power. Contacts 69b and 69c of the power control switch are respectively connected by conductors 83 and 84, sometimes hereinafter referred to as intermediate conductors, to the contacts 72b and 72c of the power control switch.

In accordance with the present invention, the power control switch 69 and the index switch 72 are arranged to effect stepping of the valve rotor from one position to the succeeding position only after the actuating vane of the timer disengages the power control switch. The switches in Fig. 4 are shown in the normally disengaged positions thereof, and when one of the vanes such as 68a engages the power control switch 69, the switch member is moved into engagement with the contact 69c to thereby establish a circuit through conductor 84, switch 72 and conductor 81 to the drive motor 58. The drive motor operates the ring gear 35 until the cam follower 77 rides out of the well 78 and operates the index switch 72. Switch member 72a is then moved into engagement with contact 72b and the drive motor stops.

The timer motor 65 is connected in the circuit so as to be energized while the drive motor is stopped, to thereby operate the timer motor until the vane 68a disengages the power control switch and the latter returns to its normal position shown in Fig. 4. More specifically, the timer motor 65 is connected by a conductor 86 to the conductor 83 and through a conductor 87 to the switch member 74a of the timer control switch 74. One of the contacts 74b of the timer control switch is connected through a conductor 88 to one of the conductors 79 leading to the source of power, and the other contact 74c is connected through a conductor 89 to the conductor 81 leading to the drive motor 58. Such connections to contacts 74a and 74b, together with the coincident operation of the timer control switch with index switch 72, provide that appropriate polarity be supplied to the timer motor 65 through conductor 87 in those steps in which timer operation is required.

Provision is made for stopping operation of the timer and drive motor at the completion of the cycle of operation and for this purpose there is provided a stop switch 91 having an operator 92 arranged for engagement by a stop vane 93 also mounted on the timing disk 66. In accordance with the present invention, the stop switch 91 has its switch member 91a and a contact 91b connected in series with the conductor 83. A second contact 91c of the switch 91 is connected through a conductor 95 to a start switch 96. The start switch 96 is otherwise connected through a conductor 97 to the other conductor 84.

From the foregoing, it is thought that the operation of the control system will be readily understood. For convenience, the operation of the valve and control system is hereinafter described as applied to a base exchange water treatment apparatus wherein the control system is operative to step the valve from a service position through a backwash position, a brine injection position, a rinse position and back to the service position at preselected time intervals corresponding to the duration of the various phases of the backwashing, brining and rinsing phases of the regeneration cycle of the water treatment apparatus.

At the beginning of the regeneration cycle, the valve rotor is in the service position shown in Fig. 2 with the lever 28 in the notch 42a. The ring gear 35 is in initial position with the cam member 37 and pusher finger 45 located between the service notch 42a and the backwash notch 42b. The well 78 on the ring gear registers with the follower 77 whereby the index switch 72 and the timer control switch 74 are in their released positions and the stop vane 93 is in engagement with the operator 92 of the stop switch. In this position of the timer disk 66, none of the vanes 68a-68d engages the operator 71 of the power control switch 69. Thus, during the service phase the switches 69, 72, 74, 91 and 96 are in the positions illustrated in Fig. 4. More specifically, the power control switch 69 engages contact 69b; the stop switch 91 engages the contact 91c; the index switch 72 engages the contact 72c; and the timer control switch 74 engages the contact 74c. The start switch is normally open and may be either manually closed by pressing the start switch in the form shown in Fig. 3, or alternatively, automatically closed by a cam 99 connected to a suitable mechanism such as a gallonage meter or a timer 100 which is arranged to effect closing of the start switch at the desired time. Initiation of the regeneration cycle is effected by closing the start switch 96 to complete a circuit from the power source through conductor 79, contact 69b of the power control switch 69, conductor 83, contact 91c of stop switch 91, conductor 95, start switch 96, conductor 97, contact 72c of index switch 72, conductor 81, drive motor 58, and conductor 82 to the power source. This energizes the drive motor 58 to rotate the ring gear 35 in the direction indicated by the arrow in Fig. 1, until the cam follower 77 rides out of the well 78 and operates the index switch 72 and the timer control switch 74 into engagement with the contacts 72b and 74b respectively. Prior to said operation of these switches, the timer motor remained de-energized. Operation of the index switch 72 and timer control switch 74 interrupts full power to the drive motor and establishes a circuit to the timer motor through conductor 88, contact 74b of the timer control switch, conductor 87, timer motor 65, conductors 86 and 83, contact 72b of the index switch 72, conductor 81, and through the drive motor 58 to conductor 82. The drive motor and timer motor are thus connected in series across the source of power. In accordance with the present invention, the timer motor is selected to have a relatively high impedance as compared to the impedance of the drive motor 58 so that only a small portion of the source voltage is dissipated across the drive motor. This voltage across the drive motor is insufficient to energize the same or to produce any undesirable heating while the voltage across the timer motor is sufficient to energize the latter and drive the timing disk 66. The timer motor is thus energized until the stop vane 93 moves out of engagement with the actuator 92 of the stop switch 91 and the stop switch member 91a then moves into engagement with contact 91b thereof. The timer motor is then shorted by a closed loop including conductor 87, contact 74b of timer control switch 74, conductor 88, conductor 79, contact 69b of power control switch 69, contact 91b of stop switch 91 and conductor 86, thereby stopping the timer motor. However, a circuit is established to the drive motor through the power control switch 69, the left segment of conductor 83, which includes contact 91b of stop switch 91, index switch 72 and conductor 81, to energize the drive motor.

The drive motor remains energized until the ring gear completes one revolution. Since the cam 37 and pusher 45 are located between the service notch 42a and the backwash notch 42b, the ring gear goes through a major portion of its revolution before the cam 37 engages the operating lever 28. When the gear completes one revolution, the operating lever is in its raised position on cam member 37 intermediate the service notch 42a and the backwash notch 42b. The cam follower 77 drops into the well 78, when the ring gear completes its revolution, thereby moving the index switch 72 and the timer switch 74 into engagement with the contacts 72c and 74c respectively. This interrupts the circuit to the drive motor 58 and establishes a circuit to the timer motor 65 through conductor 79, contact 69b of the power control switch 69, the left segment of conductor 83 which includes contact 91b of stop switch 91, conductor 86, timer motor 65, conductor 87, contact 74c of timer control switch 74, drive motor 58, to conductor 82. As before, the timer motor and drive motor are connected in series under which conditions the timer motor only operates. The timer motor remains operative for a short time until the first vane 68a on the disk engages the power control switch 69 and moves the latter into engagement with the contact 69c. This interrupts the power to the timer motor and establishes a circuit to the drive motor through conductor 84, contact 72c of index switch 72 and conductor 81. The drive motor operates to rotate the ring gear until the cam follower 77 moves out of the well 78 at which time the index switch 72 and timer switch 74 are again operated to interrupt full power to the drive motor and to establish a circuit through conductor 88, contact 74b of the timer switch 74, conductor 87, timer motor 65, conductor 86, the right segment of traveler conductor 83, contact 72b of the index switch 72, conductor 81 and drive motor 58 to conductor 82. The timer motor operates until the vane 68a disengages the power control switch whereupon the latter moves to the position shown in Fig. 4. Under these conditions the timer motor is shorted by a closed loop including conductor 87, contact 74b of timer control switch 74, conductor 88, conductor 79, contact 69b of power control switch 69, conductor 83, contact 91b of stop switch 91 and conductor 86. Power is thus applied only to the drive motor through contact 72b of the index switch 72. The ring gear 35 is then driven until it completes one revolution and steps the operating lever 28 from its position intermediate service notch 42a and backwash notch 42b to the backwash notch. When the ring gear returns to its initial position, the index and timer control switches return to the positions shown in Fig. 4. This interrupts full power to the drive motor and re-establishes a circuit from conductor 79, through contact 69b of the power control switch, the left segment of conductor 83 which includes contact 91b of the stop switch, conductor 86, timer motor 65, conductor 87, contact 74c of the timer control switch, drive motor 58 to conductor 82 to energize the timer motor. The timer motor continues in operation for a time interval corresponding to the duration of the backwash phase of the regeneration cycle at which time the succeeding vane 68b engages the power control switch. The sequence of operations, which began upon engagement of the first vane 68a with the power control switch 69, is then repeated, beginning each time one of the vanes 68b–68d engages the power control switch, to thereby rotate the ring gear 35 through one revolution whereupon the lever 28 is stepped to the next succeeding notch. Beginning with actuation of the power control switch by the last vane 68d, the same sequence of operations returns the operating lever to its service notch 42a. The timer motor 65 resumes operation and continues until the stop vane 93 engages the stop switch, thereby stopping the timer and the cycle of operations. In order to prevent a repetition of the cycle of operations, it is only necessary that the start switch 96 be opened before the stop switch 91 is operated by vane 93 at the completion of the cycle. This enables the use of an operating mechanism 100 for the start switch 96 which is relatively slow acting.

From the foregoing, it is apparent that the ring gear is initially rotated upon engagement of the power control switch by one of the vanes 68a–68d for a minor portion of its revolution until the cam follower 77 rides out of the well 78 in the ring gear. The timer motor is then operated to move the respective vane out of engagement with the power control switch whereupon the drive motor is energized until the ring gear completes its revolution and steps the valve member from one position to its succeeding position. This arrangement assures that the valve member can only be operated for movement to a succeeding position each time the power control switch is operated by the timer motor, and independent of the duration of rotation of the ring gear. This, in turn, enables the use of a relatively slow operator such as the long interval timer, for operating the power control switch, since it is not necessary that the vanes engage and disengage the power control switch in the relatively short time required to effect rotation of the ring gear through one revolution. It is further to be noted that the timer motor and the drive motor are operated alternately and that neither is in operation when the other is in operation. This precludes subsequent operation of the power control switch while the ring gear is being rotated.

The start and stop switches for the control system are arranged in the circuit in such a manner that initiation of the cycle of operations can be effected with a relatively slow operating start switch since the start switch can be depressed for either a relatively short time such as one second required to move the ring gear 35 out of its initial position, or can be held depressed for any prolonged period less than that required for the completion of the entire cycle of operations without producing spurious operation of the control system.

I claim:

1. In combination with a valve having a rotor arranged to be turned from an initial position through a plurality of rotative positions and back to said initial position, means including a gear operative upon rotation from an initial position through one complete revolution to turn said rotor from one position to a succeeding position, a valve drive motor operatively connected to said gear to rotate the latter, a control system for operating said drive motor to drive said gear through one revolution at periodic time intervals, said control circuit including a first switch means, a timer, circuit means connecting said first switch means to said drive motor and to said timer, said timer including a switch operator engageable with said first switch means for operating the latter to energize the drive motor at periodic time intervals and to simultaneously de-energize said timer, a second switch means in said circuit means, means responsive to the position of said gear engageable with said second switch means for operating said second switch means to de-energize said drive motor before said gear completes its revolution and for simultaneously energizing said timer motor whereby to move said switch operator out of engagement with said first switch means before said gear completes its revolution, said circuit means being operative in response to disengagement of said switch operator from said first switch means to de-energize said timer and to simultaneously energize said drive motor to drive said gear until the gear completes its revolution and returns to its normal position, said position responsive means being operative to disengage said second switch means when said gear returns to its initial position to de-energize said drive motor and energize the timer.

2. In combination with a valve having a rotor arranged to be turned from an initial position through a plurality of successive rotative positions and back to said initial position, means including a gear operative upon rotation from an initial position through one complete revolution to turn said rotor from one position to a succeeding position, a valve drive motor drivingly connected to said gear to rotate the latter, a control system for operating said motor to drive said gear through one revolution at preselected time intervals comprising a first three-way switch means, a timer having a switch operator for operating said first switch means at periodic time intervals, a second three-way switch means, circuit means connecting said first and second switch means to said drive motor to energize the latter when said first switch means is operated by said timer and said gear is in said initial position, cam means on said gear for operating said second switch means when said gear moves out of said initial position to de-energize said drive motor, and circuit means including a third switch means operated by said cam means on said gear for de-energizing said timer when said drive motor is energized and for energizing said timer when said drive motor is de-energized.

3. In combination with a valve having a rotor arranged to be turned from an initial position through a plurality of successive rotative positions and back to said initial position, means including a gear operative upon rotation from an initial position through one complete revolution to turn said rotor from one position to a succeeding position, a valve drive motor drivingly connected to said gear to rotate the latter, a control system for said drive motor comprising first and second three-way switches each including a pair of contacts and a switch member adapted upon operation to move out of engagement with one of its contacts and into engagement with the other of its contacts, a first power conductor connected to the switch member of said first switch, a second power conductor connected in series with said drive motor to the switch member in said second switch, a pair of intermediate conductors connecting the respective contacts in each said first and second switches to each other, a timer including a timer motor, a third single-pole-double-throw switch having a pair of contacts each connected to one of said power conductors and a switch member, circuit means connecting the switch member of said third switch in series with the timer motor to one of said intermediate conductors, means controlled by said timer for operating the switch member of said first switch at periodic time intervals, means responsive to the position of said gear for operating said second and third switches whenever said gear is out of its initial position to respectively de-energize said drive motor and to energize said timer motor to operate the timer until the switch operator thereof disengages said first switch, said control system being operative in response to disengagement of said first switch means to energize the drive motor and de-energize the timer until said means responsive to the position of the ring gear disengages said second and third switches.

4. The combination of claim 3 including a stop switch in series with said one of said intermediate conductors between said first switch and the connection of said circuit means thereto, and means operated by said timer for operating said stop switch to open circuit said one of said intermediate conductors at the completion of the timing cycle.

5. The combination of claim 3 including a stop switch having a pair of contacts and a switch member normally engaging one of said contacts and movable into engagement with the other of said contacts, said switch member and said one of said contacts being connected in series with said one of said intermediate conductors between said first switch and the connection of said circuit means to said intermediate conductor, means operated by said timer for moving the switch member of said stop switch into engagement with the other of said contacts thereof to open circuit said one of said intermediate conductors at the completion of the timing cycle, and a start switch connected to the other of the contacts of the stop switch and to the other of said traveller conductors.

6. The combination of claim 5 including means for automatically closing said start switch.

7. In combination with a valve having a rotor, an annular cam track having a plurality of circumferentially spaced notches therein defining the rotative positions of the rotor, an operating lever normally disposed in one of said notches and operatively connected to said rotor to raise and turn the rotor in response to raising and turning of said lever, a gear having an arcuate cam thereon engageable with said lever to raise the lever as the gear is rotated, means on said gear for pushing the lever therewith when the lever is raised to move the lever to the next succeeding notch, a drive motor for driving said gear, a power control switch, a timer including a plurality of switch operators arranged to engage said power control switch to actuate the latter at preselected time intervals during the timing cycle, a first circuit means including said power control switch for energizing said drive motor to drive said gear from an initial position through one revolution and back to said initial position each time the control switch is actuated, said cam and said pusher being disposed between said one of said notches and the next succeeding notch when said gear is in its initial position, a stop switch, means on said timer for actuating said stop switch at the completion of the timing cycle, means connecting said stop switch to said circuit means and to said timer to de-energize said timer when the stop switch is actuated, a start switch, and a second circuit means connecting said start switch to said stop switch and to said first circuit means and adapted upon actuation of said start switch to energize said drive motor to drive said gear through one revolution and to energize said timer to start a timing cycle.

References Cited in the file of this patent

UNITED STATES PATENTS

| | | |
|---|---|---|
| 2,254,795 | Daniels | Sept. 2, 1941 |
| 2,290,626 | Bosomworth | July 21, 1942 |
| 2,478,702 | Moody | Aug. 9, 1949 |
| 2,637,835 | Davidson | May 5, 1953 |